O. G. DASHER.
EVAPORATING PAN.
APPLICATION FILED JAN. 25, 1910.

1,007,072.

Patented Oct. 31, 1911.

UNITED STATES PATENT OFFICE.

OLIN G. DASHER, OF MARLOW, GEORGIA.

EVAPORATING-PAN.

1,007,072. Specification of Letters Patent. Patented Oct. 31, 1911.

Application filed January 25, 1910. Serial No. 540,092.

*To all whom it may concern:*

Be it known that I, OLIN G. DASHER, a citizen of the United States, and a resident of Marlow, in the county of Effingham, State of Georgia, have invented certain Improvements in Evaporating-Pans, of which the following is a specification.

My invention relates to evaporating pans, and more especially to a novel form of cooler for such pans.

The objects of my invention are to provide a syrup cooler which will enable one man to accomplish the work for which two are now needed, thus reducing the expense in the manufacture of syrup, to prevent the boiling over of the syrup when being cooked, and to prevent the same from being burned at any stage of the process.

With these and other objects in view, which will become obvious from the description of the invention hereinafter set forth, my invention consists in a certain novel construction and arrangement of the parts, as hereinafter described with reference to the accompanying drawings and more particularly pointed out in the claims.

Figure 1:
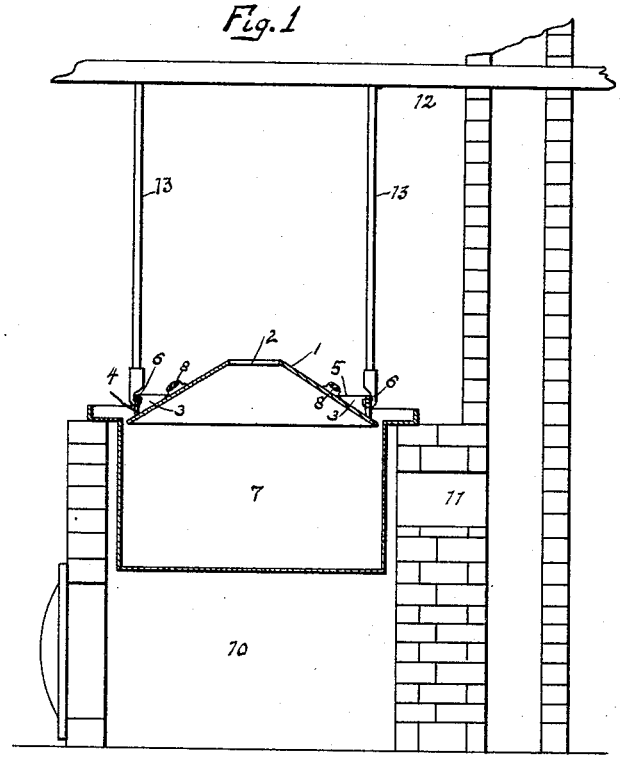
Figure 2:
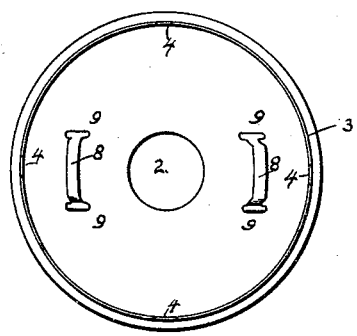

In the drawings: Figure 1 is a vertical section of an evaporating pan provided with my improved cooler, and Fig. 2 is a plan view of the cooler.

Referring to the drawings, in which the same reference characters indicate the same or corresponding parts in all the figures, 1 is a conical cover of any suitable material for the evaporating pan; this conical cover is truncated so as to provide a hole 2 in the top for the overflow of the juice as the latter boils and rises in the pan. This conical cover 1 is provided with an upwardly extending flange or rim 3 near its base, which rim has one or more apertures or juice gates 4 so cut as to leave sections 6 forming continuations of the upper edge 5 of the rim or flange 3, by which the cooler may be suspended over an evaporating pan 7, see Fig. 1, and, at the same time, furnish a way for the juice collected between the cooling surface of the cover 1 and the rim 3 to return to the pan. Handles 8 are attached to the cooler, as at 9, to provide convenient means for removing or replacing the same. It will be observed that the conical cover is imperforate, save as to the overflow opening, so that all of the syrup must flow in a thin film over the whole extent of the cooling surface, from top to bottom.

The fireplace below the pan is shown at 10 and the outlet flue to the stack at 11.

The cooler is utilized as follows: After firing the pan and filling it with the raw juice, the cooler is secured in place over the pan by any suitable means, such as braces 13 engaging the rim 3, and carried by a beam 12, supported in any convenient manner above the pan, a small space being left between the edge of the cooler and the inner rim of the pan so that the juice flowing through the gates 4 or over the rim 3 may return to the pan. When the juice boils, the foam will rise up on the inside of the cooler, flow out of the opening 2 and down the outer sloping surface 1, thereby exposing it as a thin film to the air, whereby it is not only cooled but subject to evaporation, thus expediting the process. When the juice flows down it is collected between the surface 1 of the cooler and the rim 3, and a large portion of it flows through the gate 4, and a little over the edge 5 of the rim 3. The scum floats upon this liquid between the rim and surface 1 and may be readily removed with a suitable ladle. It will be seen that, by this means, the temperature of the juice is prevented from getting too high, and burning insured against without the necessity of employing, as is now the case, a man for the sole purpose of stirring to prevent this undesirable burning. By the use of my cooler one man can easily fire the pan and do all other things necessary to the making of good syrup, and, at the same time, have a certain guarantee that the same will not be burned, and, further, the pan will not boil over and cause the juice to run out of the pan, resulting in loss, as is the case where an open-top pan is used.

I claim as my invention:

1. The combination, with an evaporating pan, of a cover therefor having a central opening and an outer edge at a lower level than said opening, and means for supporting said cover so that its lower edge will occupy a position above the level of the contents of the pan and provide an aperture between the cover and the side wall of the pan, whereby the foaming juice which escapes through the central opening in the cover will flow over the entire outer surface of the cover and will be cooled by contact with the air, the liquid flowing back into the pan through the aperture between the side wall of the latter and the cover.

2. The combination, with an evaporating pan, of a cover therefor having a central opening and between the same and the edge of the cover an upwardly projecting flange whose top is at a lower level than the central opening, and means for supporting said cover above the contents of the pan, said cover bearing such relation to the pan as to provide an aperture between the two, whereby the foaming juice which escapes through the central opening in the cover will, in its flow toward the edge of the same, be obstructed by the upwardly projecting flange, and after passing said flange, will return to the pan through the aperture between the same and the cover.

3. The combination, with an evaporating pan, of a cover therefor having a central opening and between the same and the edge of the cover an upwardly projecting flange with flow passages therethrough and a top at a lower level than the central opening, and means for supporting said cover above the contents of the pan, said cover bearing such relation to the pan as to provide an aperture between the two, whereby the foaming juice which escapes through the central opening in the cover will, in its flow toward the edge of the same, be obstructed by the upwardly projecting flange, and after passing said flange will return to the pan through the aperture between the same and the cover.

4. The combination, with an evaporating pan, of a cover therefor having a central opening and between the latter and the outer edge of the cover an upwardly projecting flange whose top is at a lower level than the opening, and means connected with said flange for supporting the cover above the contents of the pan, the cover bearing such relation to the pan that an aperture will be formed between the two, whereby the foaming juice which escapes through the central opening in the cover will, in flowing over the upper surface of the cover toward the edge, be obstructed by the upwardly projecting flange, and after passing the same will return to the pan through the aperture between the same and the cover.

5. The within described cover or cooler for an evaporating pan, said cover having a central discharge opening but being otherwise imperforate and having between the central opening and the outer edge of the cover an upwardly projecting flange whose top is at a higher level than the edge of the cover but at a lower level than the central opening therein.

6. The within described cover or cooler for an evaporating pan, said cover having a central discharge opening but being otherwise imperforate and having between the central opening and the outer edge of the cover an upwardly projecting flange whose top is at a higher level than the edge of the cover but at a lower level than the central opening therein, said flange having therein openings through which the juice can flow.

In testimony whereof, I have signed my name to this specification, in the presence of two subscribing witnesses.

OLIN G. DASHER.

Witnesses:
J. C. HUGHES,
L. C. DUGGER.

---

Copies of this patent may be obtained for five cents each, by addressing the "Commissioner of Patents, Washington, D. C."